United States Patent
Xu et al.

(10) Patent No.: US 7,671,713 B2
(45) Date of Patent: Mar. 2, 2010

(54) INTEGRATED STRUCTURE OF PASSIVE ELEMENTS IN LLC RESONANCE CONVERTER REALIZED BY FLEXIBLE CIRCUIT BOARDS

(75) Inventors: Dehong Xu, Hangzhou (CN); Yanjun Zhang, Hangzhou (CN); Yi Chen, Hangzhou (CN); Kazuaki Mino, Hino (JP)

(73) Assignees: Zhe Jiang University, Zhejiang Province (CN); Fuji Electric Systems Co., Ltd., Tokyo (JP)

( * ) Notice: Subject to any disclaimer, the term of this patent is extended or adjusted under 35 U.S.C. 154(b) by 17 days.

(21) Appl. No.: 12/068,242

(22) Filed: Feb. 4, 2008

(65) Prior Publication Data

US 2008/0186122 A1 Aug. 7, 2008

(30) Foreign Application Priority Data

Feb. 7, 2007 (CN) .................. 2007 1 0067069

(51) Int. Cl.
*H01F 27/30* (2006.01)
*H01F 21/06* (2006.01)
*H01F 21/02* (2006.01)
*H01F 27/28* (2006.01)
*H01F 27/29* (2006.01)
*H01F 5/00* (2006.01)
*H01F 17/04* (2006.01)

(52) U.S. Cl. .................. 336/185; 336/131; 336/145; 336/147; 336/180; 336/192; 336/196; 336/200; 336/206; 336/221; 336/223

(58) Field of Classification Search .................. None
See application file for complete search history.

(56) References Cited

U.S. PATENT DOCUMENTS

| | | | | |
|---|---|---|---|---|
| 3,043,000 A | * | 7/1962 | Hatfield | 29/605 |
| 3,247,476 A | * | 4/1966 | Pintell | 336/177 |
| 3,448,340 A | * | 6/1969 | Lewis | 361/37 |
| 3,483,499 A | * | 12/1969 | Lugten | 336/180 |
| 3,505,569 A | * | 4/1970 | Schweizerhof | 336/83 |
| 3,891,955 A | * | 6/1975 | Horton, III | 336/205 |
| 3,943,391 A | * | 3/1976 | Fehr | 310/103 |

(Continued)

FOREIGN PATENT DOCUMENTS

WO WO 02/093593 11/2002

*Primary Examiner*—Elvin G Enad
*Assistant Examiner*—Mangtin Lian
(74) *Attorney, Agent, or Firm*—Rabin & Berdo, PC

(57) ABSTRACT

An integrated structure of passive elements in an LLC resonance converter realized by flexible circuit boards includes a closed magnetic circuit formed by first and second magnetic cores, a tubular, double-sided, flexible circuit board, tubular magnetic-material layer and tubular, single-sided, flexible circuit board. The single-sided circuit board is coaxially sleeved in turn from inside outwards on a magnetic core column of the closed magnetic circuit. The tubular, double-sided, circuit board is a laminated plate material formed in turn of a first insulating layer, first copper foil, insulating medium layer, second copper foil and second insulating layer. The tubular, single-sided, circuit board is a laminated plate material formed in turn of a third insulating layer, third copper foil and fourth insulating layer. The integration of a resonance capacitor, resonance inductor, shunt inductor and transformer in a LLC resonance converter is realized by using these flexible circuit boards.

7 Claims, 4 Drawing Sheets

U.S. PATENT DOCUMENTS 4,173,747 A * 11/1979 Grimes et al. ................. 336/60
4,592,133 A *  6/1986 Grimes et al. ................. 29/605
5,296,830 A *  3/1994 Tamada et al. ............... 336/192
5,939,879 A *  8/1999 Wingate et al. ......... 324/207.17
6,528,859 B2 * 3/2003 Odendaal .................... 257/531

* cited by examiner

INTEGRATED STRUCTURE OF PASSIVE ELEMENTS IN LLC RESONANCE CONVERTER REALIZED BY FLEXIBLE CIRCUIT BOARDS

BACKGROUND OF THE INVENTION

1. Field of the Invention

The invention relates to an integrated structure of passive elements, and particularly to an integrated structure of passive elements in an LLC resonance converter realized by flexible circuit boards.

2. Description of the Related Art

In recent years, the trend for developing "light, thin and small" consumer electronic products has compelled the development of power electronic converters with higher and higher power density. In order to achieve a high power density, the key is how to reduce the volume size of passive elements, because the passive elements account for most of total volume in a power electronic converter. Working at a high frequency is an important direction in reducing the volume of the passive elements.

Another direction is the integration of passive elements. ZL 02801543.6, corresponding to PCT international publication no. WO 02/093593 and U.S. Pat. No. 6,528,859, proposed a short-form inductor-capacitor power processor wound by a metal foil, which realized the integration of inductors and capacitors.

However, power electronic converters, especially the power electronic converters used in consumer electronic products, due to safety considerations, are usually required to adopt transformer isolation. Therefore, if the integration of transformers, inductors and capacitors can be achieved, it will provide an integration of passive elements of a wider range and will be of greater significance.

SUMMARY OF THE INVENTION

An object of the invention is to provide an integrated structure of passive elements in an LLC resonance converter realized by flexible circuit boards.

The integrated structure of passive elements in an LLC resonance converter realized by flexible circuit boards according to the invention includes a closed magnetic circuit formed by a first magnetic core and a second magnetic core, a tubular, double-sided, flexible circuit board, a tubular magnetic-material layer and a tubular, single-sided, flexible circuit board. The single-sided, flexible circuit board is coaxially sleeved in turn from inside outwards on a magnetic core column of the closed magnetic circuit. The tubular, double-sided, flexible circuit board is constructed by winding a plate material formed by laminating in turn a first insulating layer, a first copper foil, an insulating medium layer, a second copper foil and a second insulating layer. The leading end of the first copper foil and the tail end of the second copper foil are each welded with a respective pad for connecting with an external circuit. The tubular, single-sided, flexible circuit board is constructed by winding a plate material formed by laminating in turn a third insulating layer, a third copper foil and a fourth insulating layer. The ends of the third copper foil are each welded with a respective pad for connecting with an external circuit.

In the integrated structure of passive elements according to the invention, the first copper foil, the insulating layer and the second copper foil of the tubular, double-sided, flexible circuit board constitute a resonance capacitor in the LLC resonance converter. The first copper foil, the second copper foil, and the first and second magnetic cores constitute a shunt inductor in the LLC resonance converter; the first copper foil and the second copper foil constitute at the same time the primary winding of a transformer; the third copper foil of the tubular, single-sided, flexible circuit board constitutes the secondary winding of the transformer. The leakage induction of the transformer, formed by the tubular, double-sided, flexible circuit board, the tubular, single-sided, flexible circuit board, and the first and second magnetic cores, is the resonance inductance in the LLC resonance converter. By way of regulating the thickness of the magnetic-material layer the inductance of the resonance inductor in the LLC resonance converter can be adjusted.

The integration of the resonance capacitor, the resonance inductor, the shunt inductor and the transformer in an LLC resonance converter is realized in the integrated structure of passive elements according to the invention by using the flexible circuit boards. The flexible circuit boards are of one type of printed circuit boards, which are characterized by having good flexibility, and being capable of being bent and wound, and therefore being convenient for winding onto a magnetic core column. The power density of a power electronic converter can be advantageously further increased by way of the integrated structure of passive elements according to the invention.

DESCRIPTION OF THE PREFERRED EMBODIMENTS

The present invention is further described hereinbelow with reference to the drawings.

Figure 1:
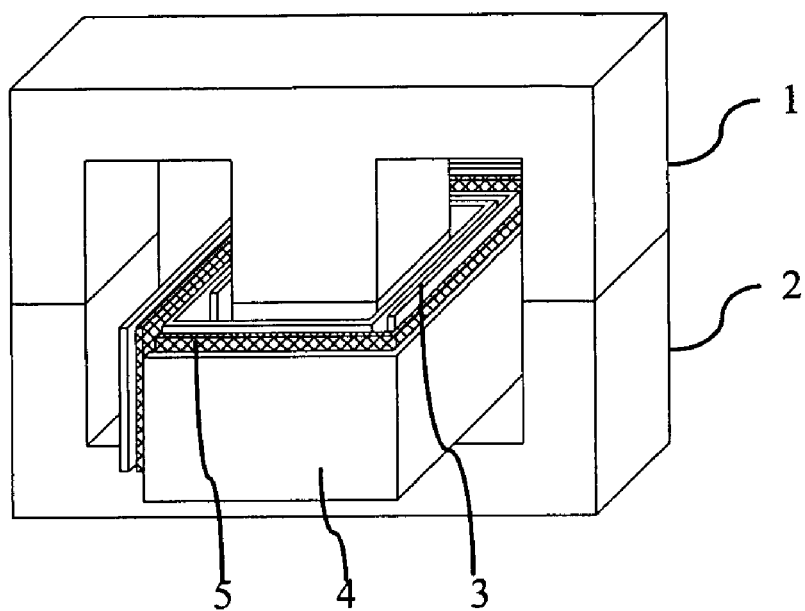
FIG. 1 is a perspective view of an embodiment of the invention.
Figure 8:
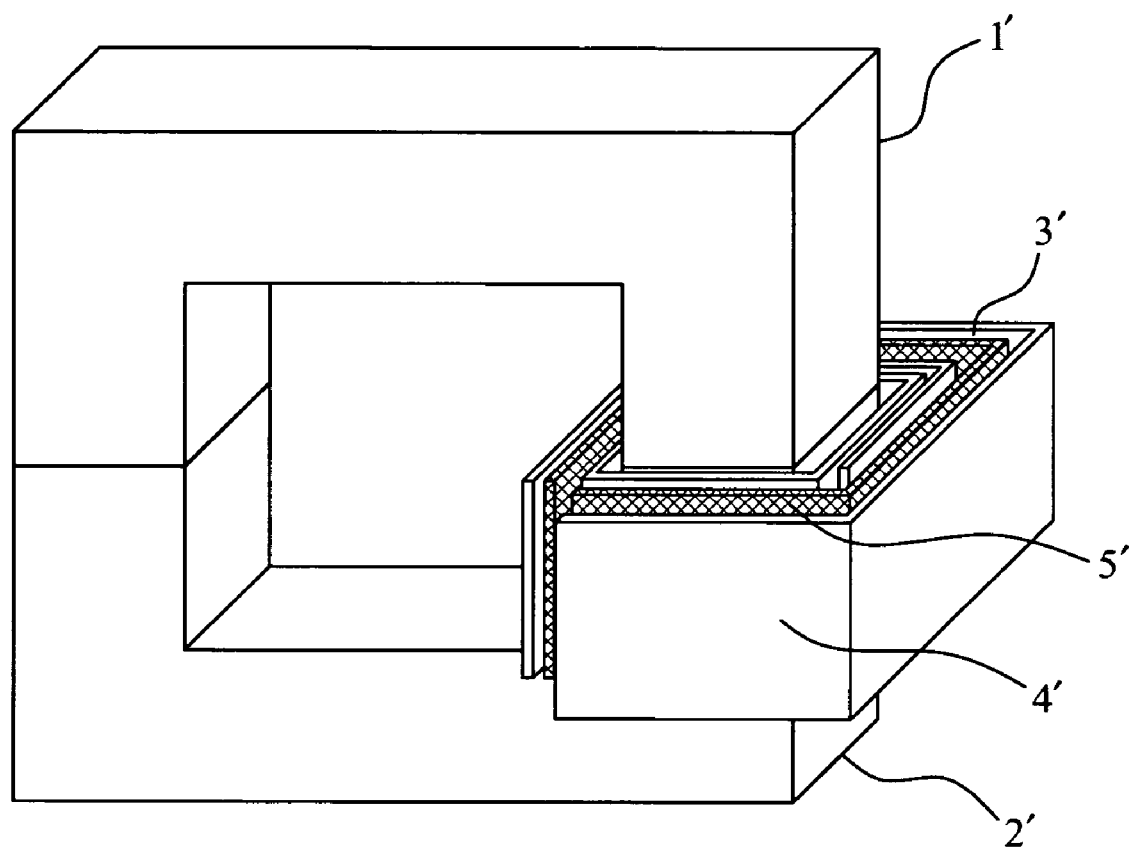
FIG. 8 is a perspective view of another embodiment of the invention.

Refer to FIG. 1, the integrated structure of passive elements in an LLC resonance converter realized by flexible circuit boards according to the invention includes a closed magnetic circuit formed by a first E-shaped magnetic core 1 and a second E-shaped magnetic core 2, each with three magnetic core columns. In the embodiment shown in the figure, the magnetic core column in the middle of the closed magnetic circuit is coaxially sleeved in turn from inside outwards, with a tubular, double-sided, flexible circuit board 3, a tubular magnetic-material layer 5 and a tubular, single-sided, flexible circuit board 4. The closed magnetic circuit alternatively can be constituted as shown in FIG. 8, by a first U-shaped magnetic core 1' and a second U-shaped magnetic core 2', each with two magnetic core columns, and the tubular, double-sided, flexible circuit board 3', the tubular magnetic-material layer 5' and the tubular, single-sided, flexible circuit board 4' are coaxially sleeved on one of them. In either embodiment, the magnetic-material layer can be of a ferrite polymer.

Figure 2:
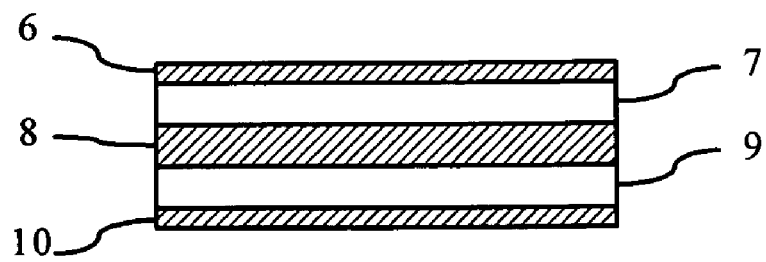
FIG. 2 is a cross-sectional view of the plate material for constituting a double-sided, flexible circuit board.
Figure 3:
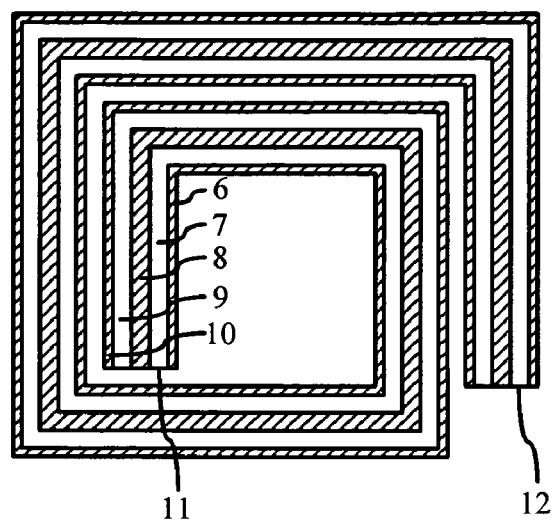
FIG. 3 is a top view of a tubular, double-sided, flexible circuit board.

Referring again to FIG. 1, the tubular, double-sided, flexible circuit board 3 is constructed by winding a plate material. As shown in the sectional view of FIG. 2, this circuit board is formed by laminating in turn a first insulating layer 6, a first copper foil 7, an insulating medium layer 8, a second copper foil 9 and a second insulating layer 10. A top view of the tubular, double-sided, flexible circuit board is shown in FIG. 3.

Figure 4:
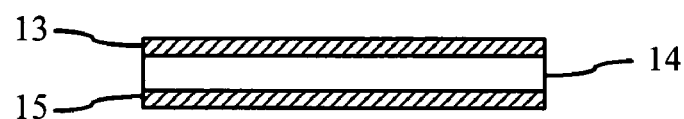
FIG. 4 is a cross-sectional view of the plate material for constituting a single-sided, flexible circuit board.
Figure 5:
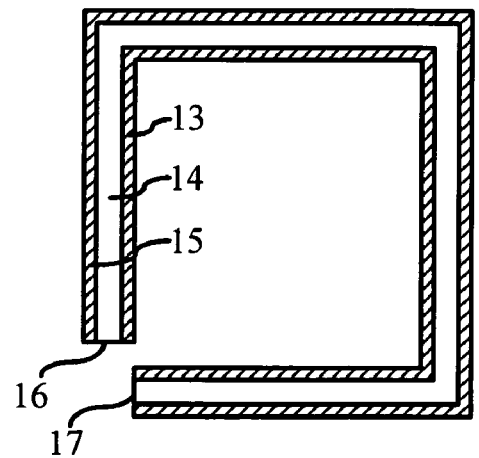
FIG. 5 is a top view of a tubular, single-sided, flexible circuit board.

The insulating medium layer 8 can be made of polyimide. The leading end of the first copper foil 7 and the tail end of the second copper foil 9 are respectively welded with pads 11 and 12 for connecting with an external circuit. The tubular, single-sided, flexible circuit board 4 is constructed by winding a plate material. As shown in section in FIG. 4, the plate material is formed by laminating in turn a third insulating layer 13, a third copper foil 14 and a fourth insulating layer 15. As is shown in the top view of the tubular, single-sided, flexible circuit board in FIG. 5, both ends of the third copper foil 14 are respectively welded with pads 16, 17 for connecting with an external circuit. In practical applications, the tubular, double-sided, flexible circuit 3 and the tubular, single-sided, flexible circuit 4 each can be wound in one turn or wound coaxially in more than one turn, according to requirements.

A plurality of primary windings and a plurality of secondary windings can also be adopted according to requirements.

Figure 6:
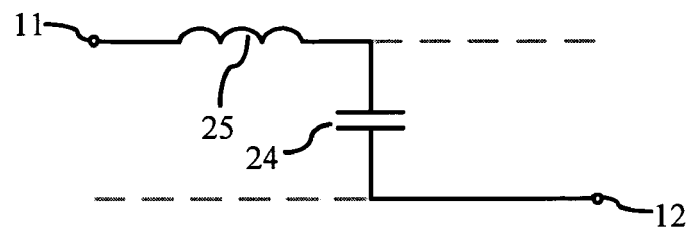
FIG. 6 is an equivalent circuit diagram with centralized parameters when the two copper foils of a double-sided, flexible circuit board are connected with an external circuit.

FIG. 6 is an equivalent circuit diagram with centralized parameters when the tubular, double-sided, flexible circuit board is connected with an external circuit through the pad 11 welded on the leading end of the first copper foil and the pad 12 welded on the tail end of the second copper foil, including a resonance capacitor 24 and a shunt inductor 25 in the LLC resonance converter.

Figure 7:
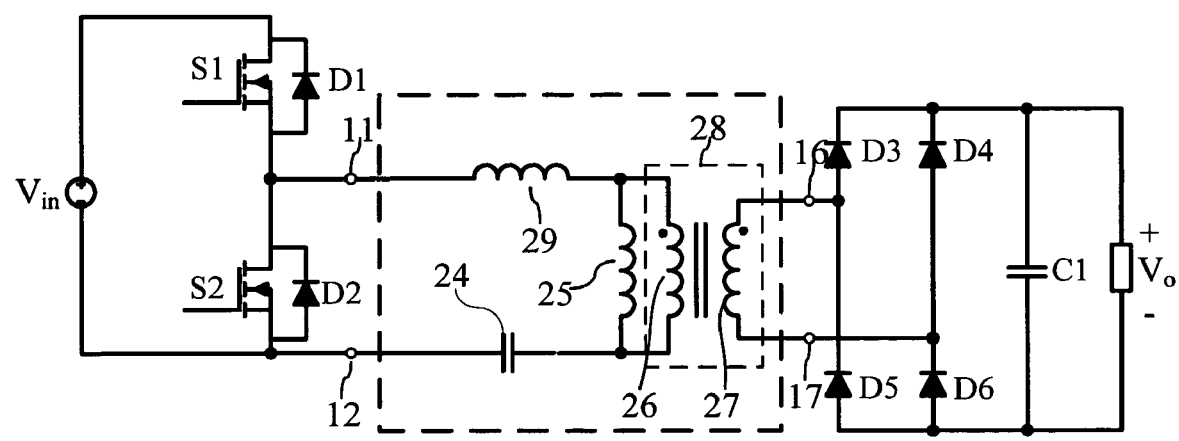
FIG. 7 is the circuit diagram of an LLC resonance converter.

FIG. 7 is the circuit diagram of the LLC resonance converter. In this figure, a power element S1 and its body diode D1 together with a power element S2 and its body diode D2 form a half-bridge inverter circuit. Also, rectifying diodes D3, D4, D5, D6 and a capacitor C1 form a full-bridge rectifying filter circuit. The primary side circuit of the converter also can use, instead of a half-bridge, a full-bridge, etc., and the secondary side rectifying circuit also can use, instead of a full-bridge rectifying circuit, a full-wave rectifying circuit. In this figure, within the large dash line box is the equivalent circuit of the integrated structure of passive elements shown in FIG. 1. The first copper foil, the insulating medium layer and the second copper foil of the tubular, double-sided, flexible circuit board constitute the resonance capacitor 24 in the LLC resonance converter. The first copper foil, the second copper foil, the first magnetic core and the second magnetic core constitute the shunt inductor 25 in the LLC resonance converter. The first copper foil and the second copper foil constitute at the same time a primary winding 26 of a transformer 28, the third copper foil of the tubular, single-sided, flexible circuit board constitutes a secondary winding 27 of the transformer 28. The leakage induction of the transformer 28, formed by the tubular, double-sided, flexible circuit board, the tubular, single-sided, flexible circuit board, and the first and second magnetic cores, is the resonance inductor 29 in the LLC resonance converter. By adjusting the thickness of the magnetic-material layer the inductance of the resonance inductor 29 in the LLC resonance converter can be adjusted. In this figure, elements 11 and 12 are respectively the pads welded on the leading end of the first copper foil and the tail end of the second copper foil for connecting with an external circuit, and elements 16 and 17 are respectively the pads welded on both ends of the third copper foil for connecting with the outer circuit.

While the invention has been particularly shown and described with reference to preferred embodiments thereof, it will be understood by those skilled in the art that the foregoing and other changes in form and details can be made therein without departing from the spirit and scope of the invention.

What is claimed is:

1. Integrated structure of passive elements in an LLC resonance converter realized by flexible circuit boards, comprising:
   a closed magnetic circuit, including a first magnetic core and a second magnetic core;
   a tubular, double-sided, flexible circuit board;
   a tubular magnetic-material layer; and
   a tubular, single-sided, flexible circuit board coaxially sleeved in turn from inside outwards on a magnetic core column of the closed magnetic circuit, wherein
   the tubular, double-sided, flexible circuit board includes a first wound, laminated plate material having in turn a first insulating layer, a first copper foil, an insulating medium layer, a second copper foil and a second insulating layer,
   the leading end of the first copper foil and the tail end of the second copper foil each have a respective pad for connecting with an external circuit, and
   the tubular, single-sided, flexible circuit board includes a second wound, laminated plate material having in turn a third insulating layer, a third copper foil and a fourth insulating layer, respective ends of the third copper foil each having an external circuit connecting pad.

2. Integrated structure according to claim 1, wherein the first and second magnetic cores are both E-shaped, arranged to form a closed magnetic circuit with three magnetic core columns, including two outer magnetic core columns and a middle magnetic core column between the two outer magnetic core columns, and the tubular, double-sided, flexible circuit board, the tubular magnetic-material layer and the tubular, single-sided, flexible circuit board are sleeved on the middle magnetic core column.

3. Integrated structure according to claim 1, wherein the first magnetic core and the second magnetic core are both U-shaped, constituting a closed magnetic circuit with two magnetic core columns, and wherein the tubular, double-sided, flexible circuit board, the tubular magnetic-material layer and the tubular, single-sided, flexible circuit board are sleeved on the one of the magnetic core columns.

4. Integrated structure according to claim 1, wherein the tubular, double-sided, flexible circuit is wound in one turn or coaxially in more than one turn.

5. Integrated structure according to claim 1, wherein the tubular, single-sided, flexible circuit is wound in one turn or coaxially in more than one turn.

6. Integrated structure according to claim 1, wherein the insulating medium layer is a polyimide.

7. Integrated structure according to claim 1, wherein the magnetic-material layer is a ferrite polymer.

* * * * *